(12) United States Patent
Milione et al.

(10) Patent No.: US 9,720,075 B2
(45) Date of Patent: Aug. 1, 2017

(54) SYSTEM AND METHOD FOR REMOTE OBJECT SENSING

(71) Applicant: NEC Laboratories America, Inc., Princeton, NJ (US)

(72) Inventors: Giovanni Milione, Franklin Square, NY (US); Neda Cvijetic, Plainsboro, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 82 days.

(21) Appl. No.: 14/946,304

(22) Filed: Nov. 19, 2015

(65) Prior Publication Data

US 2016/0146937 A1 May 26, 2016

Related U.S. Application Data

(60) Provisional application No. 62/082,716, filed on Nov. 21, 2014.

(51) Int. Cl.
| | | |
|---|---|---|
| *G01S 17/89* | (2006.01) | |
| *G01J 1/02* | (2006.01) | |
| *G01S 7/481* | (2006.01) | |
| *G01S 7/48* | (2006.01) | |
| *G01S 7/499* | (2006.01) | |
| *G01J 4/04* | (2006.01) | |

(52) U.S. Cl.
CPC .......... *G01S 7/4818* (2013.01); *G01J 4/04* (2013.01); *G01S 7/4802* (2013.01); *G01S 7/4814* (2013.01); *G01S 7/4816* (2013.01); *G01S 7/499* (2013.01)

(58) Field of Classification Search
CPC ....... G01J 4/00; G01J 1/02; G01J 4/04; G01S 17/026; G01S 7/4818; G01S 17/89; G06F 15/00; G02B 5/30; G02B 27/28
USPC ........................................................ 356/364
See application file for complete search history.

(56) References Cited

U.S. PATENT DOCUMENTS

| | | | | |
|---|---|---|---|---|
| 8,456,632 B2 * | 6/2013 | Dainty | ...................... | G01J 4/04 356/364 |
| 2010/0128268 A1 * | 5/2010 | Dainty | ...................... | G01J 4/04 356/367 |

OTHER PUBLICATIONS

Fridman, M. et al., "Real-time measurement of space-variant polarizations" Optics Express (May 2010) pp. 1-8, vol. 18, No. 10.
(Continued)

*Primary Examiner* — Roy M Punnoose
(74) *Attorney, Agent, or Firm* — Joseph Kolodka

(57) ABSTRACT

A system and method for remote object sensing which features a spatially polarization-inhomogeneous light beam that is directed on the remote object. A polarimetry receiver receives the light beam after it contacts the remote object. The changes in the spatially polarization-inhomogeneous light beam from contacting the remote object are a result of spatial features of the remote object. The polarimetry receiver is configured to measure the spatially inhomogeneous electric field of the light beam after it contacts the remote object and compute the changes in the spatially polarization-inhomogeneous light beam in order to detect spatial features of the remote object. The system obtains high-resolution, real-time information concerning important spatial features of the remote object.

18 Claims, 9 Drawing Sheets

(56) References Cited

OTHER PUBLICATIONS

Ramirez-Sanchez, V. et al., "Generation and characterization of spirally polarized fields" J. Opt. A. Pure Appln. Opt. (2009) pp. 1-6, vol. 11.

Flamm, D. et al., "Measuring the spatial polarization distribution of multimode beams emerging from passive step-index large-mode-area fibers" Optics Letters (Oct. 2010) pp. 3429-3431, vol. 35, No. 20.

* cited by examiner

SYSTEM AND METHOD FOR REMOTE OBJECT SENSING

RELATED APPLICATION INFORMATION

This application claims priority to provisional application Ser. No. 62/082,716 filed on Nov. 21, 2014, incorporated herein by reference.

BACKGROUND

Technical Field

The present invention relates to remote object sensing, and more particularly, systems and methods for remote object sensing by measuring the changes in the spatially inhomogeneous state of polarization of a spatially polarization-inhomogeneous light beam.

Description of the Related Art

There are several known processing systems and methods for remote object sensing. For example, Light Detection and Ranging (LIDAR) may be utilized to determine topographic information about an object. LIDAR involves the measuring of the travel time of a beam of light to and from an object. However, LIDAR limits the feature resolution to the spot size of the light beam which results in reduced resolution as the distance to the object increases.

Optical Angular Momentum (OAM) spectroscopy has also been utilized for remote object sensing. In OAM spectroscopy, a beam of light is directed on the object of interest and the OAM spectrum that results from the subsequent light-matter interaction is measured. While OAM spectroscopy provides increased resolution as compared to LIDAR, OAM spectroscopy requires very fine and complex control of liquid crystal on silicon spatial light modulators at the transmitter and/or receiver side in order to generate and measure the optical OAM spectrum. Furthermore, OAM spectra are difficult to accurately measure based on a high sensitivity to device misalignment and crosstalk. Therefore, a system and method for remote object sensing that provides accurate high-resolution, real-time feature detection would be highly advantageous.

SUMMARY

A method for remote object sensing which includes the steps of generating a spatially polarization-inhomogeneous light beam and directing the beam on a remote object. The method further includes the step of receiving an output light beam comprising the spatially polarization-inhomogeneous light beam after the light beam contacts the remote object by a polarimetry receiver. The electric field of the output light beam is measured and the changes in the spatially inhomogeneous state of polarization of the output light beam is determined. The spatial features of the remote object may be determined by the changes in the spatially inhomogeneous state of polarization of the output light beam.

A system for remote object sensing which includes a spatial polarization-inhomogeneous light beam generating unit that is configured to generate a spatial polarization-inhomogeneous light beam and direct the light beam on a remote object. The system further includes a polarimetry receiver that is configured to receive an output light beam comprising the spatially polarization-inhomogeneous light beam after the light beam contacts the remote object. The polarimetry receiver includes a processor, memory and an interface. The memory is configured to store a computation module which computes an electric field of the output light beam and determines changes in the spatially inhomogeneous state of polarization of the output light beam. The spatial features of the remote object may be determined by the changes in the spatially inhomogeneous state of polarization of the output light beam.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for remote object sensing by detecting features of the remote object based on the changes in the spatially inhomogeneous state of polarization of a spatially polarization-inhomogeneous light beam which is directed on the remote object and received by a polarimetry receiver thereafter. The changes in the spatially polarization-inhomogeneous light beam are a result of spatial features of the remote object. The polarimetry receiver is configured to measure the spatially inhomogeneous state of polarization of the spatially inhomogeneous electric field of the light beam output from the remote object and compute the changes in the spatially inhomogeneous state of polarization to determine spatial features of the remote object. The system obtains high-resolution, real-time information concerning important spatial features of the remote object.

Embodiments described herein may be entirely hardware, entirely software or may include both hardware and software elements which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 1:
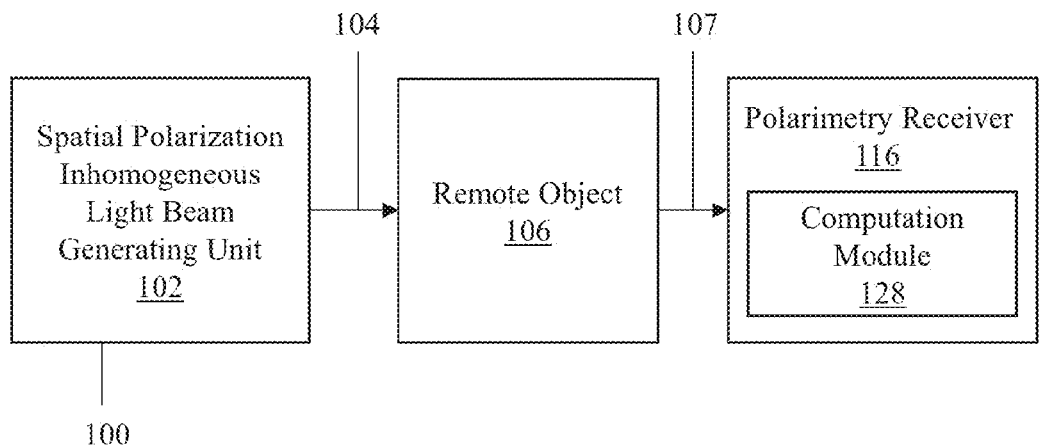
FIG. 1 is a block/flow diagram illustratively depicting a system for remote object sensing.

Referring now to the drawings in which like numerals represent the same or similar elements and initially to FIG. 1, a block/flow diagram depicting a system 100 for optical detection of a remote object 106, is illustratively shown in accordance with one embodiment of the present principles. The system 100 may include a spatial polarization-inhomogeneous light beam generating unit 102 which is configured to generate a spatial polarization-inhomogeneous light beam 104 and direct the light beam on a remote object 106. A "spatial polarization-inhomogeneous beam", also referred to as a "vectorial" beam, is a beam of light having a state of polarization that is different at each spatial point of the beam transversely, e.g., not along its propagation direction.

Figure 2:
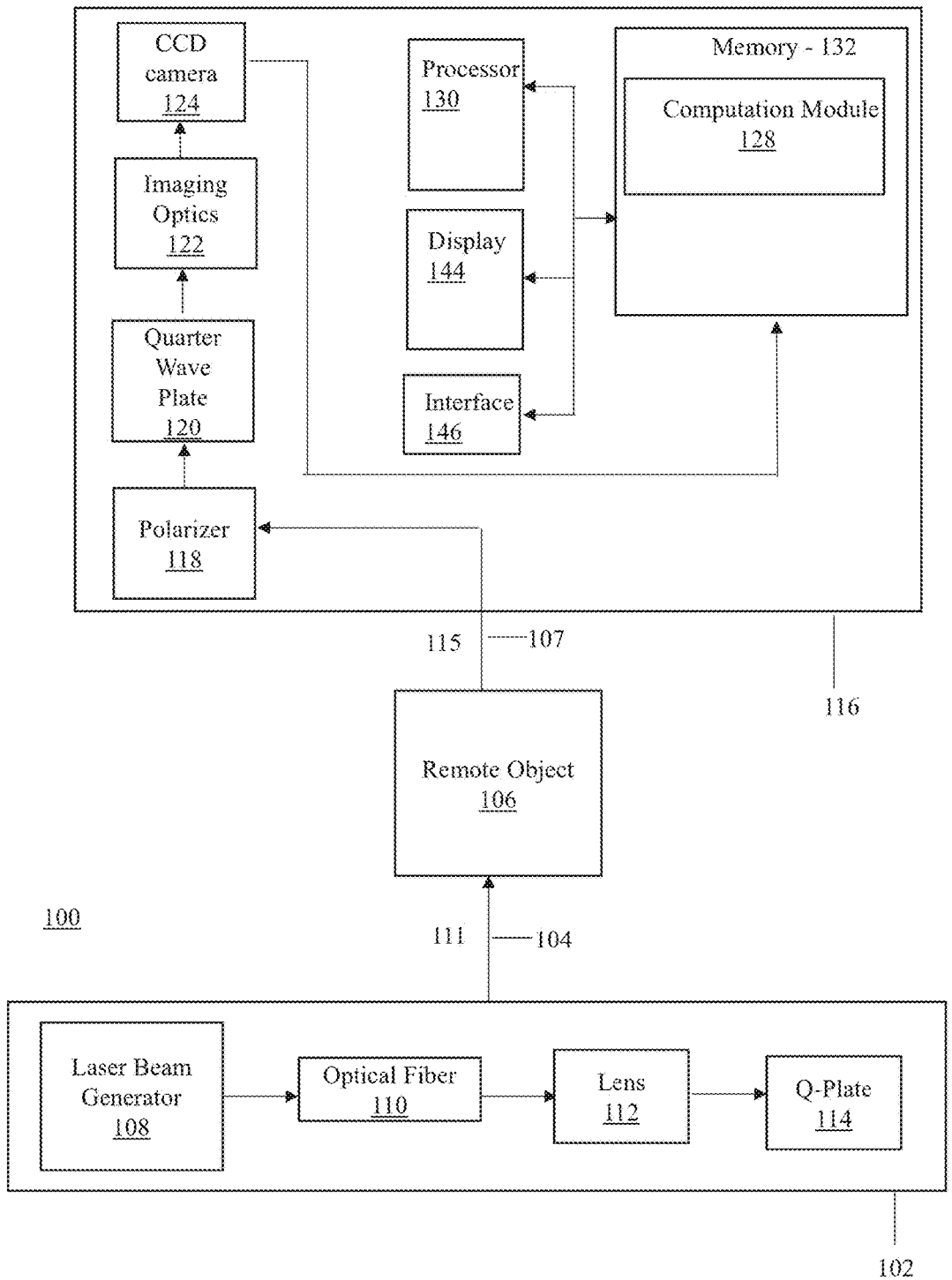
FIG. 2 is a block/flow diagram illustratively depicting another embodiment of the system for remote object sensing in accordance with the present principles.

As shown in FIG. 2, in one embodiment, the inhomogeneous light beam generating unit 102 may include a laser beam generator 108. The laser beam generator 108 may be various known devices which are configured to generate light beams having spatially polarization-homogenous light. The inhomogeneous light beam generating unit 102 may further include an optical fiber 110, such as a single mode optical fiber, that is configured to guide the spatially polarization-homogenous light beam from the laser beam generator 108. In a preferred embodiment, the inhomogeneous light beam generating unit 102 may include a lens 112 that is configured to receive the light beam from the optical fiber 110 and collimate the light beam.

The inhomogeneous light beam generating unit 102 may further include a q-plate 114. A q-plate 114 is a birefringent liquid crystal plate having a patterned transverse optical axis. The q-plate 114 is configured to transform the light beam received from the lens 112 into spatially polarization-inhomogeneous light 104. The q-plate is configured to produce a specific inhomogeneous state of polarization for the light beam which is dependent on the pattern of the q-plate.

As shown in FIG. 2, the inhomogeneous light beam generating unit 102 directs the spatially polarization-inhomogeneous light 104 to travel from the q-plate 114 through a first free-space channel 111 and contact the remote object 106. The light-matter interaction between the spatially polarization-inhomogeneous light beam 104 and the remote object 106 alters the spatial polarization content of the light beam 107 that is output from the remote object. These changes in the spatial polarization of the light beam are characteristic of the features of the remote object 106 and may be used to determine the features of the remote object.

The system 100 may further include a polarimetry receiver 116. The polarimetry receiver 116 may include one or more processors 130 and memory 132 for storing programs and applications. The polarimetry receiver 116 may further include a display 144 which permits a user to view images and interact with the system 100. The polarimetry receiver 116 may further include an interface 146 which may feature a keyboard, mouse, a joystick, a haptic device, or any other peripheral or control to permit user feedback from and interaction with the system 100. While the processor 130, memory 132, display, 144 and interface 146 are specifically shown as being components of the polarimetry receiver 116, in other embodiments, one or more of these components may be positioned in other portions of the system 100 and have connections means well known in the art, such as a communications bus, to connect to the polarimetry receiver 116.

The polarimetry receiver 116 is configured to receive the spatially polarization-inhomogeneous light beam 107 output from the remote object 106 and obtain measurements concerning the spatially inhomogeneous electric field of the output light beam. The polarimetry receiver 116 is further configured to determine the changes in the spatially inhomogeneous state of polarization of the spatially polarization-inhomogeneous light beam.

As shown in FIG. 2, the output light beam 107 from the remote object 106 travels through a second free-space channel 115. While the second free-space channel 115 is illustratively shown in the embodiment of FIG. 2 as being a separate channel from the first free-space channel 111, in some embodiments, the output light beam 107 may be reflected from the remote object 106 back through the first free-space channel to the polarimetry receiver 116.

In the embodiment shown in FIG. 2, the polarimetry receiver 116 may include a polarizer 118, such as a linear polarizer. The polarimetry receiver 116 may also include a quarter wave plate 120 which may be configured to alter the polarization state of the light beam travelling through it by converting the linearly polarized light into circularly polarized light.

The polarimetry receiver 115 may further include imaging optics 122 and a charge-coupled device (CCD) camera 124. The imaging optics are configured to receive the light beam from the quarter wave plate 120 and to output the beam on the charge-coupled device camera 124 for imaging. For example, in one embodiment, the imaging optics 122 are configured to image a 4f system onto a CCD camera 124.

Figure 3:
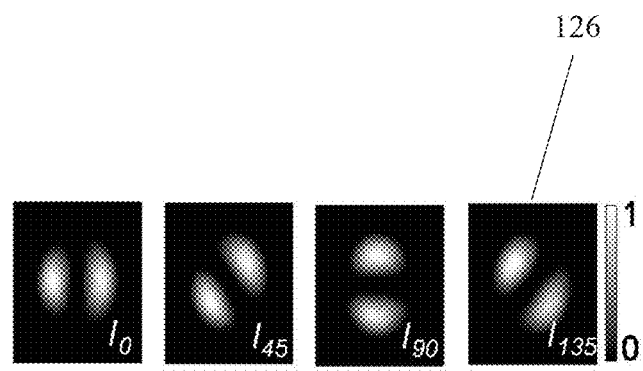
FIG. 3 is an illustrative example of imaging generated by the polarimetry receiver in accordance with the present principles.

FIG. 3 provides illustrative examples of the images 126 generated by the CCD camera 124. In FIG. 3, $I_0$, $I_{45}$, $I_{90}$, and $I_{135}$ represent the intensities of an arbitrary vector light field, $E(r,\phi)$, obtained when the polarizer 118 is rotated 0, 45, 90, and 135 degrees with respect to a reference Cartesian coordinate system.

The polarimetry receiver 115 is configured to measure the spatially inhomogeneous electric field in order to obtain a measurement-based reconstruction of the full electric field of the output light beam 107. In one embodiment, the polarimetry receiver 115 may be configured to measure the spatially inhomogeneous electric field by using Stokes polarimetry. In this embodiment, the polarimetry receiver may determine the spatially inhomogeneous electric field by rotating the polarizer 118 with respect to a reference Cartesian coordinate system to obtain four intensity values.

As shown in FIG. 3, the resulting intensities obtained when the polarizer 118 is rotated 0, 45, 90 and 135 degrees are imaged using the imaging optics 122 onto the CCD camera 124 with stronger intensity proportional to lighter pixel outputs. While not shown in FIG. 3, the right and left circular polarization content of the electric field may also be measured using the quarter wave plate 120, imaging optics 122 and CCD camera 124. While the embodiments shown in FIGS. 2-3 may utilize Stokes polarimetry to measure the spatially inhomogeneous electric field, in other embodiments, the system 100 may be configured to utilize other procedures known in the art to measure the electric field of the output light beam 107.

The polarimetry receiver 116 may include a computation module 128 that is configured to compute measurements of the spatially inhomogeneous electric field. For example, in the embodiment where the spatially inhomogeneous electric field is measured by using Stokes polarimetry, the computation module 128 may be configured to compute Stokes parameters 129 from the CCD camera images 126.

Figure 4:
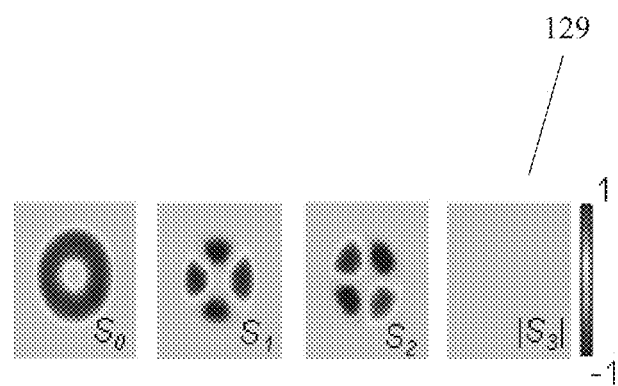
FIG. 4 is an illustrative example of Stokes parameters computed by the polarimetry receiver in accordance with the present principles.

FIG. 4 shows examples of Stokes parameters 129 computed from the images in FIG. 3. In one embodiment, the computation module 128 may utilize Equations 1-4 shown below to determine the Stokes parameters.

$$S_0(r,\phi) = I_0(r,\phi) + I_{90}(r,\phi) \quad \text{Equation 1}$$

$$S_1(r,\phi) = I_0(r,\phi) - I_{90}(r,\phi) \quad \text{Equation 2}$$

$$S_2(r,\phi) = I_{45}(r,\phi) - I_{135}(r,\phi) \quad \text{Equation 3}$$

$$S_3(r,\phi) = I_{RCP}(r,\phi) - I_{LCP}(r,\phi) \quad \text{Equation 4}$$

wherein $I_0(r,\phi)$, $I_{45}(r,\phi)$, $I_{90}(r,\phi)$, $I_{135}(r,\phi)$ are the intensities of an arbitrary vector light field, $E(r,\phi)$, obtained when analyzed using the polarizer 118 rotated 0, 45, 90, and 135 degrees with respect to a reference Cartesian coordinate system, and $I_{RCP}(r,\phi)$, $I_{LCP}(r,\phi)$ are the intensities of $E(r,\phi)$ obtained when analyzing its right and left circular polarization content, respectively, using a quarter wave plate.

The computation module 128 may also be configured to determine the angle of orientation, and ellipticity of the state of polarization of the electric field. In one embodiment, the computation module 128 may utilize Equations 5-6 to determine these values.

$$\psi(r,\phi) = \frac{1}{2}\tan^{-1}\left(\frac{S_2(r,\phi)}{S_1(r,\phi)}\right) \quad \text{Equation 5}$$

$$\chi(r,\phi) = \frac{1}{2}\sin^{-1}\left(\frac{S_3(r,\phi)}{S_0(r,\phi)}\right) \quad \text{Equation 6}$$

wherein $\psi(r,\phi)$ and $\lambda(r,\phi)$ are the angle of orientation and the ellipticity of the state of polarization, respectively, at every spatial point $(r,\phi)$.

Figure 5:
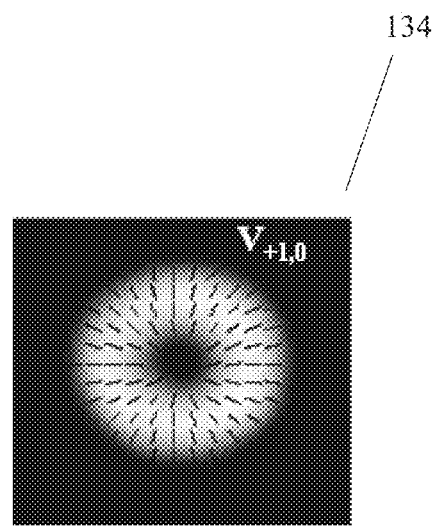
FIG. 5 is an illustrative example of a full electric field reconstruction generated by the polarimetry receiver in accordance with the present principles.

In one embodiment, the polarimetry receiver 116 is configured to generate a reconstruction 134 of the full electric field using the polarimetry results. FIG. 5 shows a full electric field reconstruction 134 generated by the polarimetry receiver 116 using the polarimetry results.

In a preferred embodiment, the computation module 128 may also be configured to determine the changes in the spatially inhomogeneous state of polarization of the spatially polarization-inhomogeneous light beam. For example, in one embodiment, the polarimetry receiver 116 is configured to determine the changes in the state of polarization of the spatially inhomogeneous light beam by measuring the vector mode spectrum of an arbitrary light field. Vector modes are spatial modes of light that carry spatially inhomogeneous state of polarization. The vector mode spectrum is the superposition of the vector modes. The polarimetry receiver 116 may be configured to determine the vector mode spectrum by measuring the optical power in each vector mode of the spectrum.

The polarimetry receiver 116 may be configured to calculate the vector mode power coefficients in each mode which results in complete vector mode decomposition. For example, the power of each vector mode, may be computed by Equation 7 shown below.

$$|c_{\ell,\gamma}(r)|^2 = \frac{1}{\sqrt{2\pi}}\int_0^{2\pi} E(r,\phi) \cdot V_{\ell,\gamma}(\phi)d\phi \quad \text{Equation 7}$$

The set of vector mode power coefficients $|c_{\ell,\gamma}(r)|^2$ corresponding to the vector field $E(r,\phi)$ is the vector mode spectrum. The vector mode spectrum may be measured by determining the power of each vector mode in the spectrum.

In one embodiment, the polarimetry receiver 116 is configured to utilize the overlap integral of equation 7 to calculate the power coefficients in each mode and determine the vector mode spectrum. The vector mode decomposition provides a complete measurement of the vector mode spectrum corresponding to the remote object 106.

Figure 6:
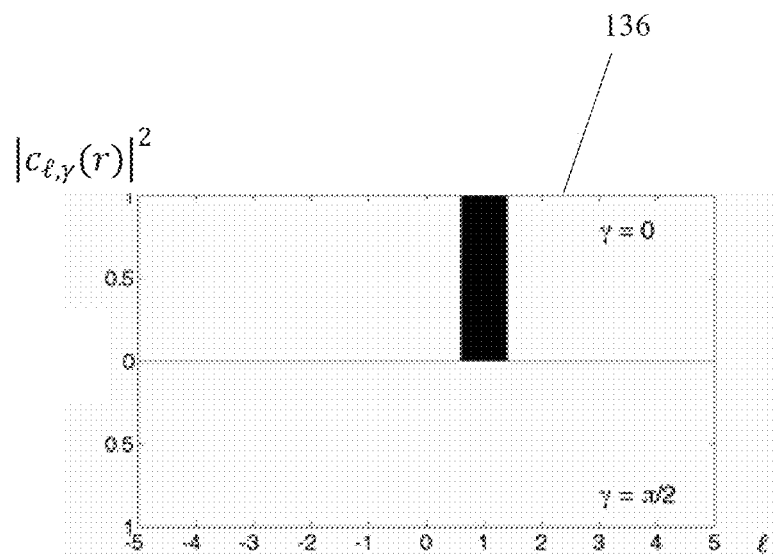
FIG. 6 is a vector mode spectrum determined by the polarimetry receiver in accordance with the present principles.

FIG. 6 shows a vector mode spectrum 136 for a fully radially-polarized beam obtained by the polarimetry results.

Based on the determined vector mode spectrum 136, the system 100 is configured to measure the changes in the state of polarization of the spatially polarization-inhomogeneous light beam. For example, in one embodiment, the vector mode spectrum of a light beam may be pre-determined, such as based on the specific characteristics of the q-plate 114 that the light beam passes therethrough. The vector mode spectrum of the light beam that has passed through the q-plate 114 but has not yet contacted the remote object may also be determined by a polarimetry receiver, varying the parameters of the light beam generating unit 102 or by other means known in the art. The vector mode spectrum of the light beam that has passed through the q-plate 115 may be stored in the memory 132.

The polarimetry receiver 116 is configured to determine the differences between the computed measurements of the spatially inhomogeneous electric field of the output light beam 107 and the vector mode spectrum of the light beam that has passed through the q-plate (but has not yet contacted the remote object 106) and the differences are indicative of features of the remote object 106, such as structural edges and corners of the remote object 106. This results in the detection of the features of the remote object 106 by the system 100 in real-time.

While the detection of the spatially inhomogeneous state of polarization of a spatially polarization-inhomogeneous light beam is illustratively described specifically with respect to the determination of the vector mode spectrum, the spatially inhomogeneous state of polarization of the spatially polarization-inhomogeneous light beam and the changes in the state of polarization may be determined by measuring other characteristics or features of the light beam or by other means known in the art.

Figure 7:
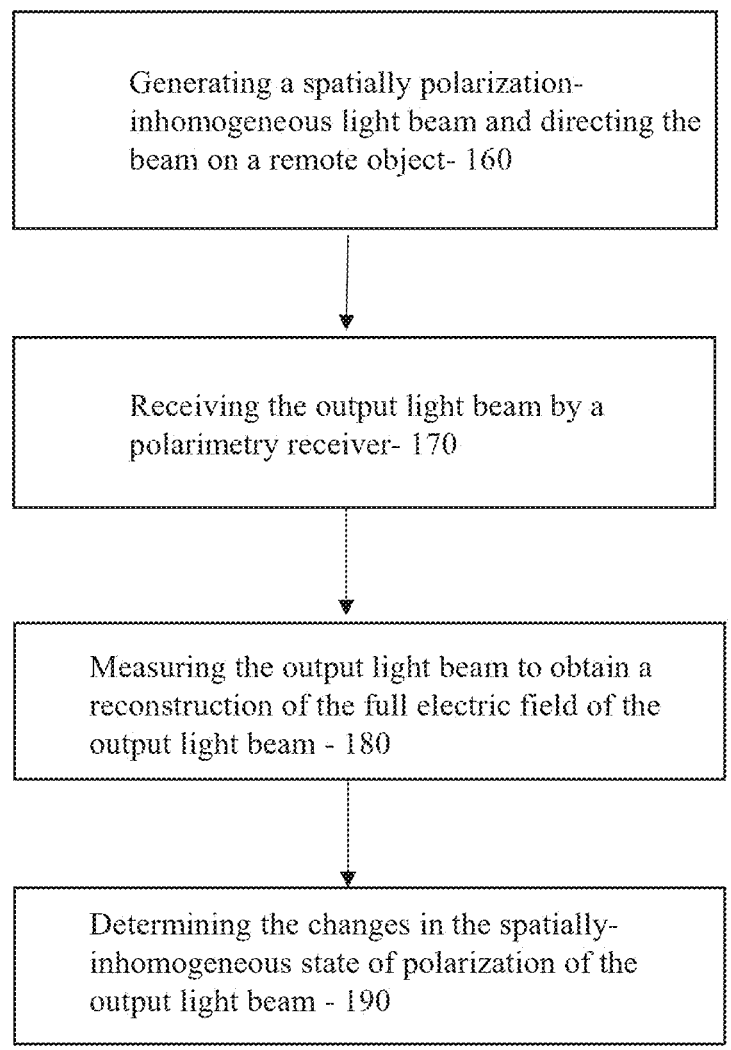
FIG. 7 is a flow diagram showing a method for remote object sensing in accordance with the present principles.

As shown in FIG. 7, the present invention is also directed to methods for remote object sensing as previously described. The method may be performed by any combination of hardware and/or software.

Referring to FIG. 7, a method 150 for remote object sensing is illustratively shown in accordance with the present principles. In block 160, a spatial polarization-inhomogeneous light beam is generated and directed on the remote object.

Figure 8:
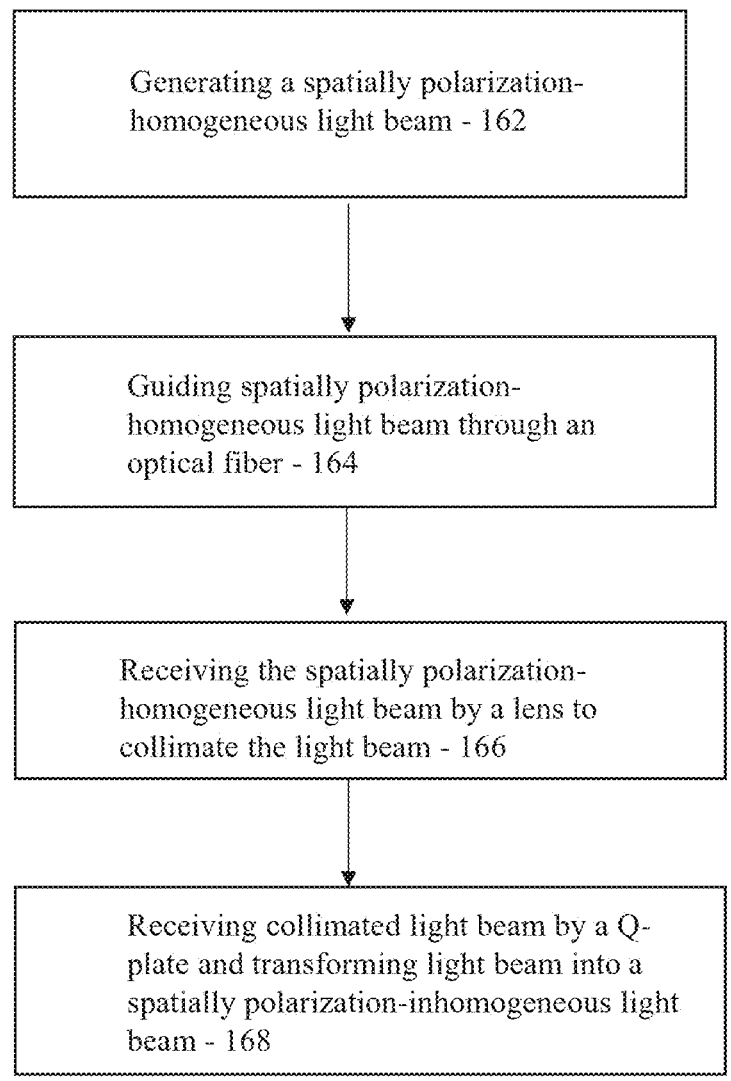
FIG. 8 is a flow diagram showing a method for generating a spatial polarization-homogeneous light beam in accordance with a preferred embodiment.

As shown in FIG. 8, the generation of the spatial polarization-inhomogeneous light beam may include the steps of generating 162 a spatially polarization-homogeneous light beam. The spatially polarization-homogeneous light beam may then be guided 164 through an optical fiber. The light beam may then be received 166 by a lens which collimates the light beam. The collimated light beam may then be received 168 by a q-plate which transforms the light beam into a spatially polarization-inhomogeneous light.

Figure 9:
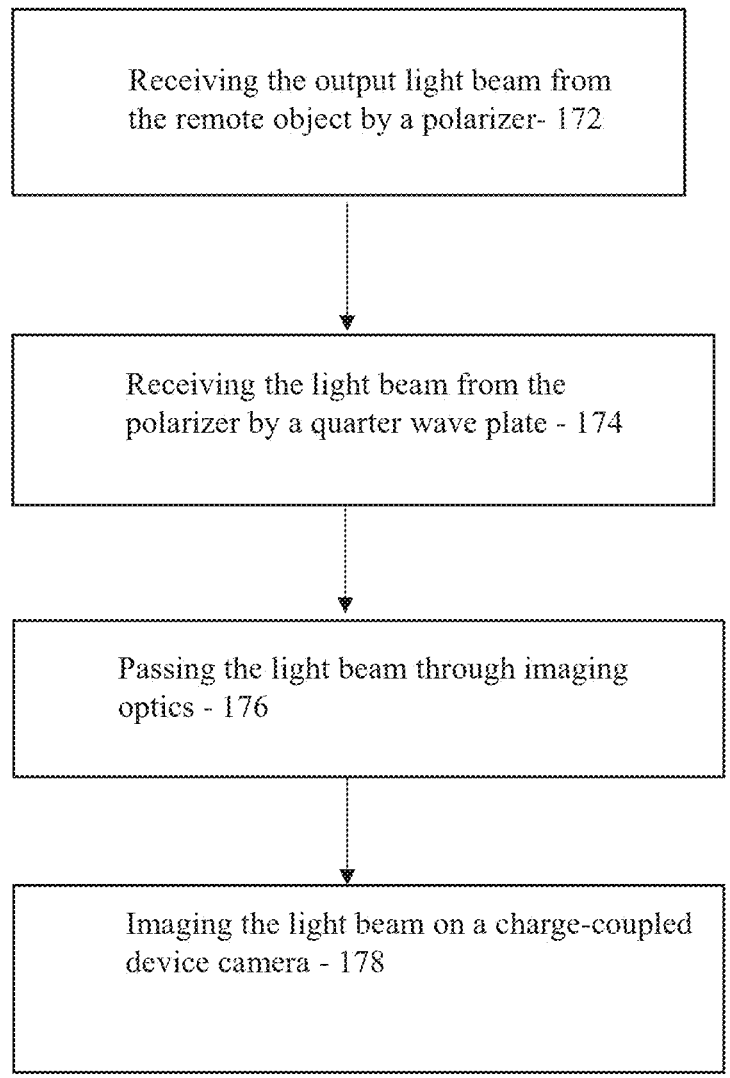
FIG. 9 is a flow diagram showing a method for receiving the output light beam by a polarimetry receiver in accordance with a preferred embodiment.

The spatially polarization-inhomogeneous light beam then interacts with the remote object and the output light beam is received 170 by the polarimetry receiver as described in detail with respect to the system 100 of the present invention. As shown in FIG. 9, the step of receiving the output light beam by a polarimetry receiver may include receiving 172 the output light beam from the remote object by a polarizer. The light beam from the polarizer may then be received 174 by a quarter wave plate. The light beam may then be passed 176 through imaging optics. After being received by the imaging optics, the light beam is imaged 178 on a charge-coupled device camera.

The output light beam is then measured 180 to obtain a reconstruction of the full electric field of the output light beam. As described in detail with respect to the system 100, this may be achieved by Stokes polarimetry or by other means known in the art.

In block 190, the changes in the spatially-inhomogeneous state of polarization of the output light beam is determined. For example, the changes in the spatially-inhomogeneous state of polarization of the output light beam may be determined by measuring the vector mode power coefficients in each mode in order to determine the vector mode spectrum and comparing the measured vector mode spectrum with the vector mode spectrum of the light beam after it has passed through the q-plate. In one embodiment, the overlap integral of Equation 7 is utilized to determine the calculated power coefficients. Based on the determined changes in the spatially-inhomogeneous state of polarization of the output light beam, features concerning the remote object are detected.

While the above configuration and steps are illustratively depicted according to one embodiment of the present principles, it is contemplated that other sorts of configurations and steps may also be employed according to the present principles. While various components have been illustratively described as separate components, the components may be formed in a variety of integrated hardware or software configurations.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for remote object sensing comprising the steps of:
   generating a spatially polarization-inhomogeneous light beam and directing the beam on a remote object;
   receiving an output light beam comprising the spatially polarization-inhomogeneous light beam after the light beam contacts the remote object by a polarimetry receiver;
   measuring an electric field of the output light beam; and
   determining changes in a spatially inhomogeneous state of polarization of the output light beam to determine spatial features of the remote object.

2. The method as recited in claim 1, wherein Stokes polarimetry is utilized to measure the electric field of the output light beam.

3. The method as recited in claim 1, wherein generating a spatially polarization-inhomogeneous light beam includes the steps of:
   generating a spatially polarization-homogeneous light beam;
   guiding the spatially polarization-homogeneous light beam through an optical fiber;
   receiving the spatially polarization-homogeneous light beam by a lens to collimate the light beam; and
   receiving a collimated light beam by a q-plate which transforms the light beam into a spatially polarization-inhomogeneous light beam.

4. The method as recited in claim 1, wherein receiving an output light beam includes the steps of:
   receiving the output light beam by a polarizer;
   receiving the output light beam by a quarter wave plate;
   passing the output light beam through imaging optics; and
   imaging the light beam on a charge-coupled device camera.

5. The method as recited in claim 2, further comprising the step of computing Stokes parameters from the imaging generated by the charge-coupled device camera.

6. The method as recited in claim 1, comprising the further step of measuring the angle of orientation and the ellipticity of the state of polarization of the output light beam.

7. The method as recited in claim 1, wherein the changes in the spatially inhomogeneous state of polarization of the output light beam are determined by determining a vector mode spectrum of the output light beam and comparing the vector mode spectrum of the output light beam with a vector mode spectrum of a light beam prior to contacting the remote object.

8. The method as recited in claim 1, comprising the further step of generating a reconstruction of a full electric field of the output light beam.

9. The method as recited in claim 7, wherein vector mode power coefficients are computed in order to determine the vector mode spectrum of the output light beam.

10. A system for remote object sensing comprising,
    a spatial polarization-inhomogeneous light beam generating unit that is configured to generate a spatial polarization-inhomogeneous light beam and direct the light beam on a remote object; and a polarimetry receiver that is configured to receive an output light beam comprising the spatially polarization-inhomogeneous light beam after the light beam contacts the remote object, said polarimetry receiver including:

a processor, memory and an interface, wherein said memory is configured to store a computation module which computes an electric field of the output light beam and determines changes in a spatially inhomogeneous state of polarization of the output light beam to determine spatial features of the remote object.

11. The system as recited in claim 10, wherein the spatial polarization-inhomogeneous light beam generating unit comprises:

a laser beam generator configured to generate light beams having spatially polarization-homogeneous light;

an optical fiber that receives the light beam from the laser beam generator;

a lens that receives the light beam from the optical fiber and collimates the light beam; and a q-plate which receives the light beam from the lens and transforms the light beam into a spatially polarization-inhomogeneous light beam.

12. The system as recited in claim 10, wherein the polarimetry receiver includes:

a polarizer;

a quarter wave plate;

imaging optics; and a charge-coupled device camera.

13. The system as recited in claim 12, wherein the polarizer is a linear polarizer.

14. The system as recited in claim 10, wherein the polarimetry receiver is configured to compute the electric field of the output light beam by utilizing Stokes polarimetry.

15. The system as recited in claim 10, wherein the polarimetry receiver is configured to measure the angle of orientation and the ellipticity of the state of polarization of the output light beam.

16. The system as recited in claim 10, wherein the computation module is configured to determine changes in the spatially inhomogeneous state of polarization of the output light beam by determining a vector mode spectrum of the output light beam and comparing the vector mode spectrum of the output light beam with a vector mode spectrum of a light beam prior to contacting the remote object.

17. The system as recited in claim 10, wherein the polarimetry receiver is configured to generate a reconstruction of a full electric field of the output light beam.

18. The system as recited in claim 16, wherein the polarimetry receiver is configured to compute vector mode power coefficients in order to determine the vector mode spectrum of the output light beam.

* * * * *